US012222076B1

(12) United States Patent
She

(10) Patent No.: US 12,222,076 B1
(45) Date of Patent: Feb. 11, 2025

(54) ELECTRONIC CANDLE WITH HIGHLY SIMULATED FLAME EFFECT

(71) Applicant: DONGGUAN SHUIQUANZI INDUSTRIAL CO., LTD., Dongguan (CN)

(72) Inventor: Huilin She, Dongguan (CN)

(73) Assignee: DONGGUAN SHUIQUANZI INDUSTRIAL CO., LTD., Dongguan (CN)

( * ) Notice: Subject to any disclaimer, the term of this patent is extended or adjusted under 35 U.S.C. 154(b) by 0 days.

(21) Appl. No.: 18/409,835

(22) Filed: Jan. 11, 2024

(30) Foreign Application Priority Data

Dec. 12, 2023 (CN) ......................... 202311708079.9

(51) Int. Cl.

| | |
|---|---|
| ***F21S 10/04*** | (2006.01) |
| ***F21K 9/61*** | (2016.01) |
| ***F21K 9/65*** | (2016.01) |
| ***F21K 9/66*** | (2016.01) |
| ***F21V 1/16*** | (2018.01) |
| ***F21V 19/00*** | (2006.01) |
| *F21V 23/00* | (2015.01) |
| *F21Y 101/00* | (2016.01) |
| *F21Y 113/13* | (2016.01) |
| *F21Y 115/10* | (2016.01) |

(52) U.S. Cl.

CPC .............. *F21S 10/046* (2013.01); *F21K 9/61* (2016.08); *F21K 9/65* (2016.08); *F21K 9/66* (2016.08); *F21S 10/043* (2013.01); *F21V 1/16* (2013.01); *F21V 19/003* (2013.01); *F21V 23/006* (2013.01); *F21Y 2101/00* (2013.01); *F21Y 2113/13* (2016.08); *F21Y 2115/10* (2016.08)

(58) Field of Classification Search

CPC ......... F21S 10/046; F21S 10/043; F21K 9/61; F21K 9/66; F21K 9/65; F21V 1/16; F21V 19/003; F21V 23/006; F21Y 2113/13; F21Y 2115/10; F21Y 2101/00

USPC .......................................................... 362/392

See application file for complete search history.

(56) References Cited

U.S. PATENT DOCUMENTS

| | | | | |
|---|---|---|---|---|
| 11,105,478 | B1 * | 8/2021 | Ding ......................... | F21S 9/00 |
| 2021/0080070 | A1 * | 3/2021 | Chiang ................. | F21S 10/043 |

FOREIGN PATENT DOCUMENTS

| | | | |
|---|---|---|---|
| CN | 101865413 | B | 8/2012 |
| CN | 116146925 | A | 5/2023 |

* cited by examiner

*Primary Examiner* — Joseph L Williams
*Assistant Examiner* — Hana S Featherly
(74) *Attorney, Agent, or Firm* — Pilloff Passino & Cosenza LLP; Rachel Pilloff; Sean Passino

(57) ABSTRACT

An electronic candle with a highly simulated flame effect, including a housing having a top wall and a cylindrical peripheral wall, where the top wall has a through hole in the center; a flame head, passing upward through the through hole and including a candle flame-like luminous body and a simulated cotton core column, where the luminous body including an LED lamp bead and a light guide cup at the bottom, the LED lamp bead and the light guide cup are each a misty colloid component, a transmittance of the LED lamp bead is higher than a transmittance of the light guide cup, a first light-emitting chip and a second light-emitting chip that separately change in light and dark are provided in the LED lamp bead vertically, the first light-emitting chip located above emits warm white light upward, and the second light-emitting chip located below emits blue light downward.

9 Claims, 3 Drawing Sheets

ELECTRONIC CANDLE WITH HIGHLY SIMULATED FLAME EFFECT

CROSS REFERENCE TO RELATED APPLICATIONS

This application is based upon and claims foreign priority to Chinese Patent Application No. 202311708079.9, filed on Dec. 12, 2023, the entire contents of which are incorporated herein by reference.

TECHNICAL FIELD

The present disclosure relates to the technical field of simulated electronic candles.

BACKGROUND

Being smoke-free and highly safe, with long service lives and other characteristics, simulated electronic candles have been used to replace conventional candles in many occasions. The core and difficulty of the simulated electronic candle are how to simulate a more realistic dynamic effect of a candle flame and how to meet usage time requirements of various scenarios in consideration of the product energy consumption.

Currently, for a first type of commonly seen simulated electronic candle structure, refer to an electronic light-emitting device for simulating real fire and a method for simulating real fire disclosed in the Chinese patent with an authorized notice number CN101865413B. The electronic light-emitting device projects a light ray of a light-emitting element onto a surface of a swinging flame sheet to produce, on the surface of the flame sheet, dynamic light and shadow effects similar to flame burning. However, such a structure has the following disadvantages: Only a single surface of the flame sheet has the light and shadow effect, and when the swing amplitude of the flame sheet is slightly larger, the light and shadow of the light-emitting element deviates from the flame sheet and is projected to a background wall and other objects, leading to a relatively poor simulation effect.

For a second type of simulated electronic candle structure, refer to an LED simulated flame device disclosed in the Chinese patent application No. CN116146925A. The simulated flame device includes a semi-transparent diffuser cover in a shape of a candle flame and a luminous light panel inserted into an accommodating chamber. The luminous light panel is provided with a plurality of LED chips with random light and dark gradients. Through light and dark changes of the LED chips, dynamic light and shadow effects can be displayed on the diffuser cover in the shape of a candle flame. Such a structure has the following disadvantages: The diffuser cover can only be a semi-transparent structural member, to prevent the LED chips and the luminous light panel on an inner wall from being seen. Therefore, light emitted by the LED chips is relatively dim, and the dynamic light and shadow produced by each LED chip through light and dark changes is black light and shadow, differing greatly from a burning effect of a real flame.

It is difficult for the above two common electronic candles, as well as other existing simulated electronic candle structures, to achieve a layered and integrated effect of a cotton wick, an inner flame, an outer flame, and a flame center presented by a real flame when a candle burns.

SUMMARY

In view of the disadvantages of the existing electronic candle such as a low degree of flame simulation, the present disclosure provides an electronic candle with a highly simulated flame effect.

To achieve the foregoing objective, the present disclosure adopts by the following technical solutions:

An electronic candle with a highly simulated flame effect includes: a housing, including a top wall and a cylindrical peripheral wall that form an accommodating chamber, where the top wall has a through hole in the center; a flame head, passing upward through the through hole and including a candle flame-like luminous body and a black simulated cotton core column concentrically connected to the bottom of the luminous body, where the luminous body includes an LED lamp bead and a light guide cup located at the bottom of the LED lamp bead, the LED lamp bead and the light guide cup are each a misty colloid component, a transmittance of the LED lamp bead is higher than a transmittance of the light guide cup, a first light-emitting chip and a second light-emitting chip are provided in the LED lamp bead along a vertical central axis, the first light-emitting chip located above emits warm white light upward, the second light-emitting chip located below emits blue light downward, and light rays of the first light-emitting chip and the second light-emitting chip separately change in light and dark; and a translucent lampshade, fixed to the housing and covering the periphery of the luminous body, where the translucent lampshade is a transparent material component, and transverse raster textures are formed into an inner surface of the translucent lampshade.

In a preferred solution, the electronic candle further includes a swinging device provided in the accommodating chamber for driving the flame head to swing.

In a preferred solution, the swinging device includes: horizontal shafts, formed by two pins of the LED lamp bead vertically penetrating into the accommodating chamber and bent to two outer sides separately, where the two horizontal shafts on the two sides are provided concentrically; a support frame, provided in the accommodating chamber and including two vertical metal sheets opposite to each other on the left and right, and a support slot formed in an upper part of each of the metal sheets, where the two horizontal shafts removably pass through the support slots on the two sides, respectively; a counterweight assembly, including a columnar body suspended and fixed to the two pins and a magnetic member fixed to the bottom of the columnar body, where the center of gravity of the counterweight assembly is located on the vertical central axis of the flame head; and a printed circuit board (PCB), horizontally provided at the bottom of the counterweight assembly and electrically connected to bottom ends of the two metal sheets by welding, where the PCB is provided with a control chip for controlling operation of the first light-emitting chip and the second light-emitting chip, and an electromagnetic coil provided correspondingly under the magnetic member for driving the magnetic member to swing.

In a preferred solution, the support frame further includes a plastic frame, and the plastic frame includes a bottom plate and two vertical slots extending vertically from the bottom plate; and the metal sheet is inserted and fixed in the vertical slot, and the PCB is fixedly clamped to the bottom plate.

In a preferred solution, the columnar body includes two parts fixed to each other, and the columnar body has an axial hole for the pin to pass through and a radial hole that is located between bonding surfaces of the two parts and in communication with the axial hole for clamping the horizontal shaft.

In a preferred solution, a limiting column parallel to the horizontal shaft and used for limiting a range of horizontal movement of the columnar body also extends from each of two sides of the columnar body.

In a preferred solution, the translucent lampshade is cylindrical and adapted to be sleeved over the peripheral wall of the housing and has a top end above the flame head, and the raster texture is distributed at least in a part of the translucent lampshade beyond the top wall of the housing.

In a preferred solution, the translucent lampshade is in a shape of a flame and has the bottom fixed to a center of the top wall of the housing, and there is a gap space between an inner wall of the translucent lampshade and an outer peripheral wall of the flame head.

In a preferred solution, the raster texture has a slit width of 0.5 mm and a depth of 0.07 mm.

The present disclosure has the following beneficial effects: When in use, the first light-emitting chip emits warm white light upward, and the LED lamp bead is a misty colloid component. According to the Tyndall effect, the warm white light is scattered by misty colloid particles, so that the upper part and surrounding side of the first light-emitting chip on the luminous body present white light with a high brightness, thereby simulating an effect of a bright inner flame in a real candle flame. After the warm white light emitted from the LED lamp bead is diffracted by transverse raster textures of the translucent lampshade, the light and shadow of the LED lamp bead are stretched upward, and a layer of light yellow light and shadow appears on the periphery, especially the top, of the LED lamp bead, so that an effect of a light yellow outer flame in a real candle flame can be simulated. The second light-emitting chip emits blue light downward. Similarly, according to the Tyndall effect, the blue light is scattered by misty colloid particles of the LED lamp bead and the light guide cup, and the concentration of the misty colloid particles of the light guide cup is greater than that of the misty colloid particles of the LED lamp bead, so that blue light is formed below the second light-emitting chip of the luminous body and gradually deepened, thereby simulating an effect of a deeper blue flame center in a real candle flame. After the blue light from the light guide cup is diffracted by the transverse raster textures of the translucent lampshade, the light and shadow of the light guide cup are stretched downward to the periphery of the black simulated cotton core column, thereby simulating a burning effect of a black cotton wick wrapped by the flame center in a real flame. In addition, after the light and shadow of the flame head are dispersed by the raster textures of the translucent lampshade, the light and shadow blend with each other at a junction of the inner flame, the outer flame, the flame center, and the cotton wick, so that a natural transition of light and shadow between layers of a real candle flame can be simulated. The first light-emitting chip and the second light-emitting chip separately have light and dark changes, so that the layers of light and shadow can simulate dynamic light and dark effects of a real flame. In addition, compared with the semi-transparent diffuser cover in the prior art, the translucent lampshade in this solution is a transparent material component. Therefore, not only the light and shadow of the flame head are brighter with more realistic colors, but also the raster textures prevent an internal structure of the flame head from being exposed. To sum up, the flame effect is highly simulated in this solution.

BRIEF DESCRIPTION OF THE DRAWINGS

The present disclosure is described in further detail below with reference to the accompanying drawings and specific embodiments.

DETAILED DESCRIPTION OF THE EMBODIMENTS

The present disclosure is further described below with reference to the accompanying drawings.

Embodiment 1

Figure 1:
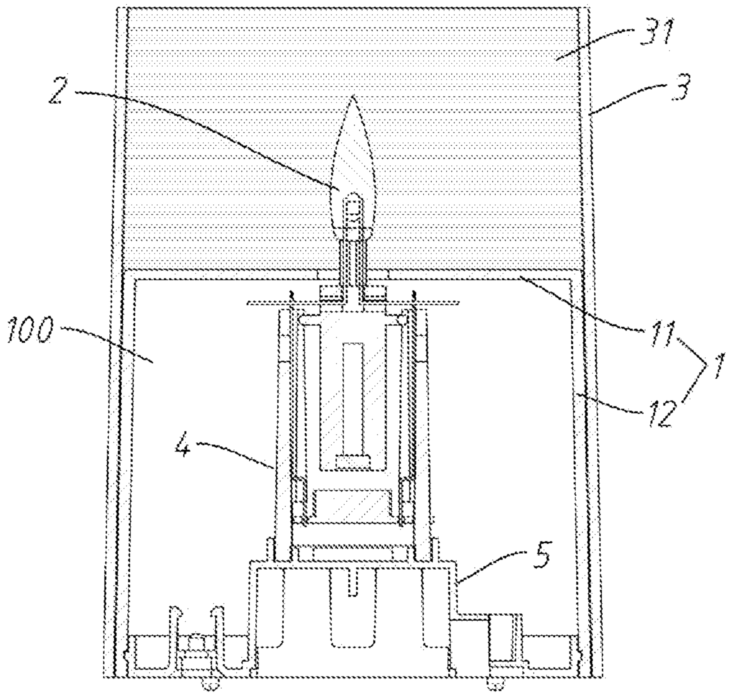
FIG. 1 is a vertical schematic structural cross-sectional view of an electronic candle according to Embodiment 1.
Figure 2:
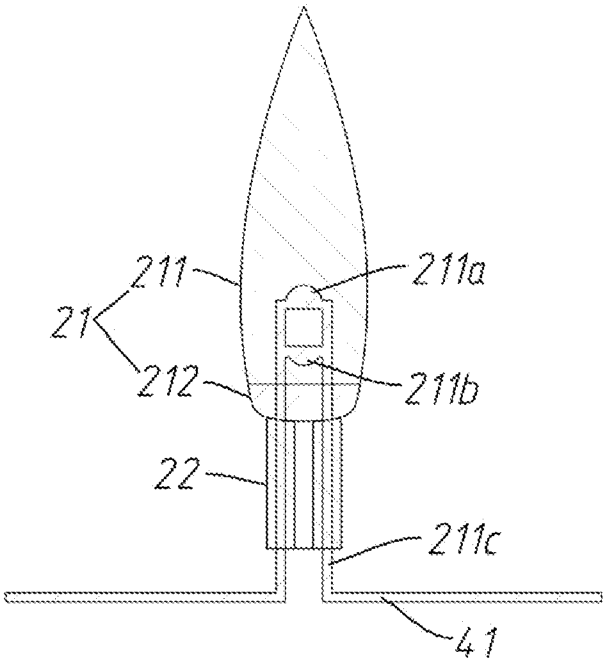
FIG. 2 is a vertical schematic structural cross-sectional view of a flame head according to Embodiment 1.
Figure 3:
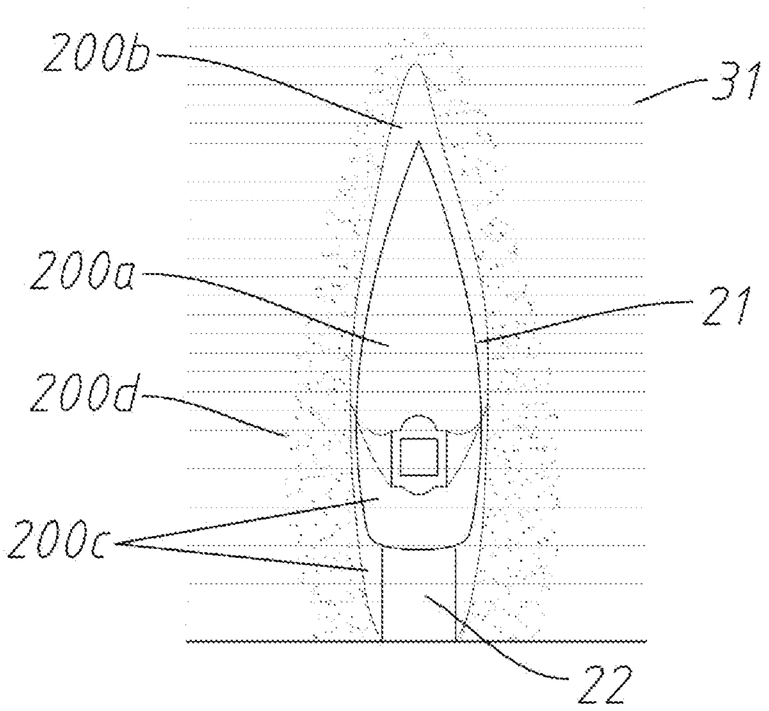
FIG. 3 a schematic diagram of light and shadow effects of the electronic candle according to Embodiment 1.

Referring to FIG. 1 to FIG. 3, an electronic candle in this embodiment includes: a housing 1, including a top wall 11 and a cylindrical peripheral wall 12 that form an accommodating chamber 100, where the top wall 11 has a through hole in the center; a flame head 2, passing upward through the through hole and including a candle flame-like luminous body 21 and a black simulated cotton core column 22 concentrically connected to the bottom of the luminous body 21, where the luminous body 21 includes an LED lamp bead 211 and a light guide cup 212 located at the bottom of the LED lamp bead 211, the LED lamp bead 211 and the light guide cup 212 are each a misty colloid component, a transmittance of the LED lamp bead 211 is higher than that of the light guide cup 212, a first light-emitting chip 211*a* and a second light-emitting chip 211*b* are provided in the LED lamp bead 211 along a vertical central axis, the first light-emitting chip 211*a* located above emits warm white light upward, the second light-emitting chip 211*b* located below emits blue light downward, and light rays of the first light-emitting chip 211*a* and the second light-emitting chip 211*b* separately change in light and dark; and a translucent lampshade 3, fixed to the housing 1 and covering the periphery of the luminous body 21, where the translucent lampshade 3 is a transparent material component, and transverse raster textures 31 are formed into an inner surface of the translucent lampshade 3. The raster texture 31 has a slit width of 0.5 mm and a depth of 0.07 mm.

When in use, the first light-emitting chip 211*a* emits warm white light upward, and the LED lamp bead 211 is a misty colloid component. According to the Tyndall effect, the in warm white light is scattered by misty colloid particles, so that the upper part and surrounding side of the first light-emitting chip 211*a* on the luminous body 21 present white light with a high brightness, thereby simulating an effect of a bright inner flame 200*a* in a real candle flame. After the warm white light emitted from the LED lamp bead 211 is diffracted by the transverse raster textures 31 of the translucent lampshade 3, the light and shadow of the LED lamp bead 211 are stretched upward, and a layer of light yellow light and shadow appears on the periphery, especially the top, of the LED lamp bead 211, so that an effect of a light yellow outer flame 200*b* in a real candle flame can be simulated. The second light-emitting chip 211*b* emits blue light downward. Similarly, according to the Tyndall effect, the blue light is scattered by misty colloid particles of the LED lamp bead 211 and the light guide cup 212, and the concentration of the misty colloid particles of the light guide cup 212 is greater than that of the misty colloid particles of the LED lamp bead 211, so that blue light is formed below the second light-emitting chip 211*b* of the luminous body 21 and gradually deepened, thereby simulating an effect of a deeper blue flame center 200*c* in a real candle flame. After the blue light from the light guide cup 212 is diffracted by the transverse raster textures 31 of the translucent lampshade 3, the light and shadow of the light guide cup 212 are stretched downward to the periphery of the black simulated cotton core column 22, thereby simulating a burning effect of a black cotton wick wrapped by the flame center 200*c* in a real flame. In addition, after the light and shadow of the flame head 2 are dispersed by the raster textures 31 of the translucent lampshade 3, the light and shadow blend with each other at a junction of the inner flame 200*a*, the outer flame 200*b*, the flame center 200*c*, and the cotton wick, so that a natural transition of light and shadow between layers of a real candle flame can be simulated. The first light-emitting chip 211*a* and the second light-emitting chip 211*b* separately have light and dark changes, so that the layers of light and shadow can simulate dynamic light and dark effects of a real flame. In addition, compared with the semi-transparent diffuser cover in the prior art, the translucent lampshade 3 in this solution is a transparent material component. Therefore, not only the light and shadow of the flame head 2 are brighter with more realistic colors, but also the raster textures 31 prevent an internal structure of the flame head 2 from being exposed. To sum up, the flame effect is highly simulated in this solution.

Figure 4:
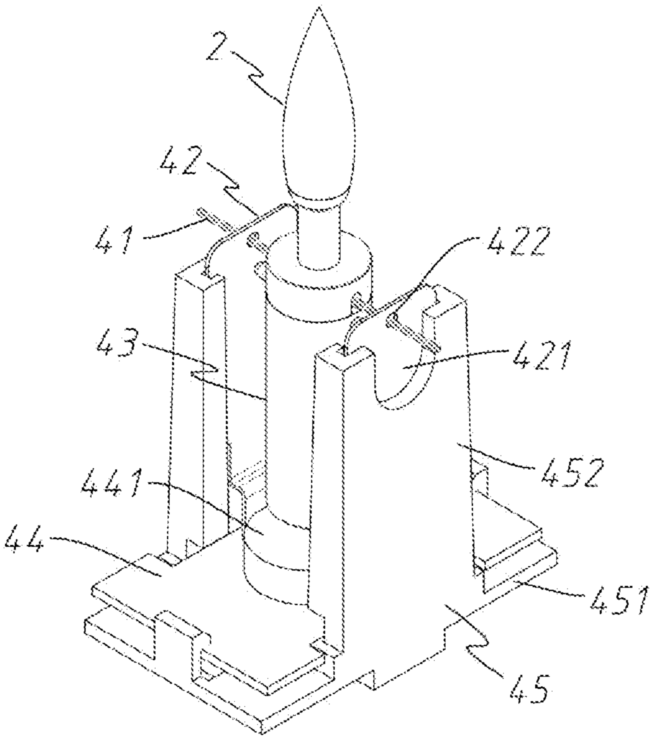
FIG. 4 is a schematic structural diagram of a swinging device according to Embodiment 1.
Figure 5:
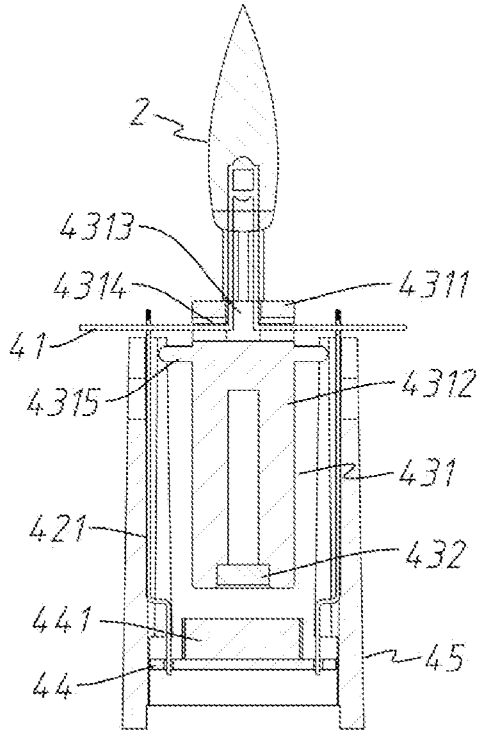
FIG. 5 is a vertical schematic structural cross-sectional view of the swinging device in FIG. 4.

The luminous body 21 may be mounted fixedly or swingably. The fixedly mounted structure can be achieved by using the prior art, and therefore, is not described in detail. In this embodiment, the structure is mounted swingably, and referring to FIG. 4 and FIG. 5, includes a swinging device 4 provided in the accommodating chamber 100 for driving the flame head 2 to swing. There are many mature swinging device solutions in the prior art, and details are not described herein. The swinging device 4 drives the flame head 2 to randomly swing, and the light and shadow of the flame head 2 are revealed through the raster textures 31 of the translucent lampshade 3, so that a dynamic effect of a flame swinging with the wind can be simulated, thereby making a burning effect of the flame more realistic. In the swinging process, the raster textures 31 of the translucent lampshade 3 disperse the light and shadow, thereby blurring edges of the light and shadow of the flame. Compared with the prior art in which the outlines of the flame and the cotton wick are clear, the light and shadow of the flame in this solution are more realistic and natural.

In a preferred structure, the swinging device 4 includes: horizontal shafts 41, formed by two pins 211*c* of the LED lamp bead 211 vertically penetrating into the accommodating chamber 100 and bent to two outer sides separately, where the two horizontal shafts 41 on the two sides are provided concentrically; a support frame 42, provided in the accommodating chamber 100 and including two vertical metal sheets 421 opposite to each other on the left and right, and a support slot 422 formed in an upper part of each of the metal sheets 421, where the two horizontal shafts 41 removably pass through the support slots 422 on the two sides, respectively; a counterweight assembly 43, including a columnar body 431 suspended and fixed to the two pins 211*c* and a magnetic member 432 fixed to the bottom of the columnar body 431, where the center of gravity of the counterweight assembly 43 is located on the vertical central axis of the flame head 2; and a PCB 44, horizontally provided at the bottom of the counterweight assembly 43 and electrically connected to bottom ends of the two metal sheets 421 by welding, where the PCB 44 is provided with a control chip for controlling operation of the first light-emitting chip 211*a* and the second light-emitting chip 211*b*, and an electromagnetic coil 441 provided correspondingly under the magnetic member 432 for driving the magnetic member 432 to swing.

The working principle is as follows: The control chip of the PCB 44 is electrically connected to the two pins 211*c* of the LED lamp bead 211 through the metal sheets 421 on the two sides in a contact manner to control the first light-emitting chip 211*a* and the second light-emitting chip 211*b* to separately make light and dark changes. The electromagnetic coil 441 generates intermittent electromagnetic signals under the action of the control chip, thereby stimulating the magnetic member 432 to drive the luminous body to randomly swing around the horizontal shafts 41. The horizontal shafts 41 are formed by bending the two pins 211*c* of the LED lamp bead 211. Therefore, the structure and assembly are simple and the overall weight is light. Compared with the existing swinging device, in this solution, energy consumption required for swinging is significantly reduced, so that the duration for using the electronic candle each time can be lengthened. The electrical connection between the horizontal shafts 41 and the metal sheets 421 in a contact manner allows the omission of an electrical connection line between the LED lamp bead 211 and the PCB 44, thereby resolving the disadvantages in the prior art that the electrical connection line restricts the swing of the flame head 2 and makes the swing unnatural and that the electrical connection line is easy to crack during long-term swinging. In addition, this also simplifies the assembly of the product.

In this embodiment, the support frame 42 further includes a plastic frame 45. The plastic frame 45 includes a bottom plate 451 and two vertical slots 452 extending vertically from the bottom. The metal sheet 421 is inserted and fixed in the vertical slot 452. The PCB 44 is fixedly clamped to the bottom plate 451. Further, a battery box 5 is fixed to the bottom of the accommodating chamber 100 of the housing 1. The plastic frame 45 is fixedly clamped to a top surface of the battery box 5. The plastic frame 45 can further strengthen the mounting structure of the PCB 44 and the metal sheets 421, and facilitates the mounting and fixation of the flame head 2 and the swinging device 4 in the accommodating chamber 100.

In this embodiment, the columnar body 431 includes an upper segment portion 4311 and a lower segment portion 4312. The upper segment portion 4311 has an axial hole 4313 for the pin 211*c* to pass through. Bonding surfaces of the upper segment portion 4311 and the lower segment portion 4312 each have a radially communicating radial hole 4314 for clamping the horizontal shafts 41. Specifically, the upper segment portion 4311 and the lower segment portion 4312 can be fixed together through a plug connection structure. During assembly, the pins 211*c* of the LED lamp bead 211 sequentially pass through the light guide cup 212, the simulated cotton core column 22, and the axial hole 4313 in the upper segment portion 4311, and then the horizontal shafts 41 are bent to the outer sides and placed corresponding to the radial hole 4314. Finally, the lower segment portion 4312 and the upper segment portion 4311 are plugged and fixed. In this way, the assembly of the pins 211*c* and the columnar body 431 becomes simple. In other embodiments, the columnar body 431 may alternatively be two parts that are plug-fitted on the left and right.

In this embodiment, a limiting column 4315 parallel to the horizontal shaft 41 and used for limiting a range of horizontal movement of the columnar body 431 also extends from each of two sides of the columnar body 431. There is a gap between each end of the limiting column 4315 and the metal sheet 421, so that the columnar body 431 can swing freely without deviating to the two sides horizontally to cause jamming, and the flame head 2 can always maintain a central position on the top of the housing 1.

In this embodiment, the translucent lampshade 3 is cylindrical and adapted to be sleeved over the peripheral wall 12 of the housing 1 and has a top end above the flame head 2. The raster texture 31 is distributed at least in a part of the translucent lampshade 3 beyond the top wall 11 of the housing 1. The translucent lampshade 3 causes the electronic candle to be in a shape of a teacup candle. Through the translucent lampshade 3, not only a realistic dynamic effect of a flame can be displayed, but also an additional halo 200*d* is produced at the periphery of the light and shadow of the flame under the action of the raster textures 31, thereby simulating a more realistic effect of light and shadow closer to candle lighting.

Embodiment 2

Figure 6:
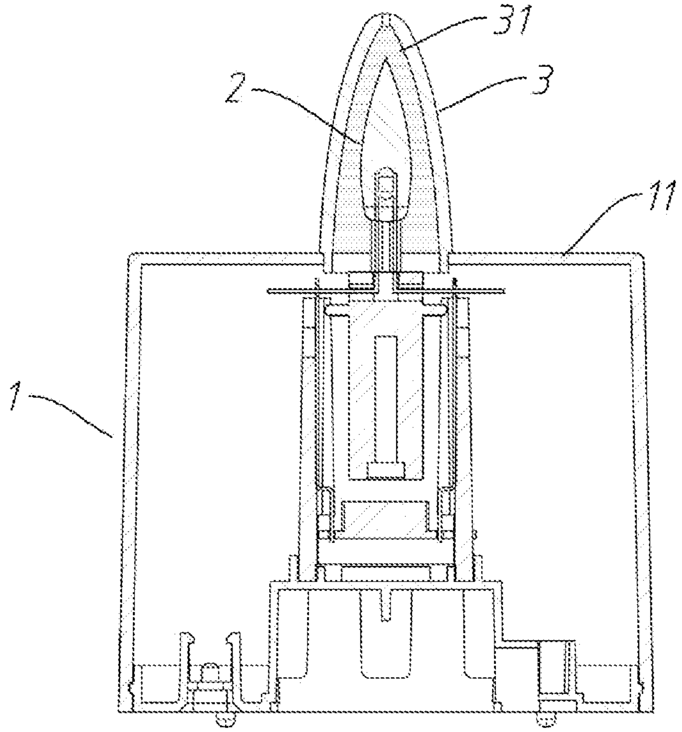
FIG. 6 is a vertical schematic structural cross-sectional view of an electronic candle in Embodiment 2.

Referring to FIG. 6, other structures of this embodiment are basically the same as those of Embodiment 1, except that: the translucent lampshade 3 is in a shape of a flame and has the bottom fixed to a center of the top wall 11 of the housing 1, and there is a gap space between an inner wall of the translucent lampshade 3 and an outer peripheral wall 12 of the flame head 2. The translucent lampshade 3 causes the electronic candle to be in a shape of an ordinary candle, and the translucent lampshade 3 is used for simulating an outline of the flame. The gap space between the translucent lampshade 3 and the flame head 2 is used for both providing a swing space for the flame head 2, and providing a light and shadow space for a part simulating the outer flame 200*b* of the flame and a part simulating burning of the cotton wick wrapped by the flame center 200*c*.

The foregoing descriptions are not intended to have any limitation on the technical scope of the present disclosure. Any alterations, equivalent changes, and modifications made to the foregoing embodiments in accordance with the technical essence of the present disclosure still fall within the scope of the technical solutions of the present disclosure.

What is claimed is:

1. An electronic candle with a highly simulated flame effect, comprising:

a housing, comprising a top wall and a cylindrical peripheral wall that form an accommodating chamber, wherein the top wall has a through hole in the center;

a flame head, passing upward through the through hole and comprising a candle flame-like luminous body and a black simulated cotton core column concentrically connected to a bottom of the candle flame-like luminous body, wherein the candle flame-like luminous body comprises an LED lamp bead and a light guide cup located at the bottom of the LED lamp bead, the LED lamp bead and the light guide cup are each a misty colloid component, a transmittance of the LED lamp bead is higher than a transmittance of the light guide cup, a first light-emitting chip and a second light-emitting chip are provided in the LED lamp bead along a vertical central axis, the first light-emitting chip located above emits warm white light upward, the second light-emitting chip located below emits blue light downward, and light rays of the first light-emitting chip and the second light-emitting chip separately change in light and dark;

a translucent lampshade, fixed to the housing and covering a periphery of the candle flame-like luminous body, wherein the translucent lampshade is a transparent material component, and transverse raster textures are formed into an inner surface of the translucent lampshade;

wherein the warm white light emitted from the first light-emitting chip is scattered by the LED lamp bead to form a white inner flame on the candle flame-like luminous body;

the warm white light emitted from the LED lamp bead is stretched upward by the transverse raster textures of the translucent lampshade to form a light yellow outer flame from the outer perimeter of the LED lamp bead to the top of the LED lamp bead;

the blue light emitted from the second light-emitting chip is scattered by the light guide cup to form a blue flame center that deepens downward, the blue light passing through the light guide cup is stretched downward by the raster textures of the translucent lampshade to form a flame center that wraps around the black simulated cotton core column; and the light and shadow of the flame head at a junction of the white inner flame, the yellow outer flame, and the flame center are dispersed by the raster textures of the translucent lampshade to blend with each other.

2. The electronic candle with a highly simulated flame effect according to claim 1, further comprising a swinging device provided in the accommodating chamber for driving the flame head to swing.

3. The electronic candle with a highly simulated flame effect according to claim 2, wherein the swinging device comprises:

horizontal shafts, formed by two pins of the LED lamp bead vertically penetrating into the accommodating chamber and bent to two outer sides separately, wherein the two horizontal shafts on the two sides are provided concentrically;

a support frame, provided in the accommodating chamber and comprising two vertical metal sheets opposite to each other on the left and right, and a support slot formed in an upper part of each of the metal sheets, wherein the two horizontal shafts removably pass through the support slots on the two sides, respectively;

a counterweight assembly, comprising a columnar body suspended and fixed to the two pins and a magnetic member fixed to the bottom of the columnar body, wherein the center of gravity of the counterweight assembly is located on the vertical central axis of the flame head; and a printed circuit board (PCB), horizontally provided at the bottom of the counterweight assembly and electrically connected to bottom ends of the two metal sheets by welding, wherein the PCB is provided with a control chip for controlling operation of the first light-emitting chip and the second light-emitting chip, and an electromagnetic coil provided correspondingly under the magnetic member for driving the magnetic member to swing.

4. The electronic candle with a highly simulated flame effect according to claim 3, wherein the support frame further comprises a plastic frame, and the plastic frame comprises a bottom plate and two vertical slots extending vertically from the bottom plate; and the metal sheet is inserted and fixed in the vertical slot, and the PCB is fixedly clamped to the bottom plate.

5. The electronic candle with a highly simulated flame effect according to claim 3, wherein the columnar body comprises two parts fixed to each other, and the columnar body has an axial hole for the pin to pass through and a radial hole that is located between bonding surfaces of the two parts and in communication with the axial hole for clamping the horizontal shaft.

6. The electronic candle with a highly simulated flame effect according to claim 5, wherein a limiting column parallel to the horizontal shaft and used for limiting a range of horizontal movement of the columnar body also extends from each of two sides of the columnar body.

7. The electronic candle with a highly simulated flame effect according to claim 1, wherein the translucent lampshade is cylindrical and adapted to be sleeved over the peripheral wall of the housing and has a top end above the flame head, and the raster texture is distributed at least in a part of the translucent lampshade beyond the top wall of the housing.

8. The electronic candle with a highly simulated flame effect according to claim 1, wherein the translucent lampshade is in a shape of a flame and has the bottom fixed to a center of the top wall of the housing, and there is a gap space between an inner wall of the translucent lampshade and an outer peripheral wall of the flame head.

9. The electronic candle with a highly simulated flame effect according to claim 1, wherein the raster texture has a slit width of 0.5 mm and a depth of 0.07 mm.

* * * * *